United States Patent
Miller et al.

(10) Patent No.: US 10,322,373 B2
(45) Date of Patent: Jun. 18, 2019

(54) METHOD FOR CONTROLLING AN EXHAUST GAS TREATMENT SYSTEM

(71) Applicant: GM GLOBAL TECHNOLOGY OPERATIONS LLC, Detroit, MI (US)

(72) Inventors: Jon C. Miller, Fenton, MI (US); Michael A. Smith, Clarkston, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 202 days.

(21) Appl. No.: 15/260,787

(22) Filed: Sep. 9, 2016

(65) Prior Publication Data
US 2018/0071681 A1 Mar. 15, 2018

(51) Int. Cl.
*F01N 3/20* (2006.01)
*F01N 9/00* (2006.01)
(Continued)

(52) U.S. Cl.
CPC ..... *B01D 53/9431* (2013.01); *B01D 53/9445* (2013.01); *B01D 53/9495* (2013.01);
(Continued)

(58) Field of Classification Search
CPC ............ B01D 53/9431; B01D 53/9445; B01D 53/9495; B01D 53/96; B01D 2257/404;
(Continued)

(56) References Cited

U.S. PATENT DOCUMENTS

2006/0010857 A1* 1/2006 Hu .................... F01N 3/035
 60/286
2011/0167805 A1* 7/2011 Chen .................. F01N 3/023
 60/286
(Continued)

OTHER PUBLICATIONS

U.S. Appl. No. 15/225,972, filed Aug. 2, 2016, Titled: Method for Controlling an Exhaust Gas Treatment System, Patentee: GM Global Technology Operations LLC.

*Primary Examiner* — Brandon D Lee (57) ABSTRACT

Provided is a method for controlling an exhaust gas treatment system, wherein the system includes an exhaust gas stream supplied by an exhaust gas source to a selective catalytic reduction (SCR) device and a particulate filter device. The method comprises detecting a threshold level of reductant deposits proximate the SCR device, and initiating a selective catalytic reduction device service in response thereto. A threshold level of reductant deposits is detected using a reductant deposit model comprising determining an actual SCR $NO_x$ conversion using measured process variables; and comparing the actual SCR $NO_x$ conversion to a calibrated $NO_x$ conversion value. The calibrated $NO_x$ conversion value is determined using exhaust gas flow and system temperature values which substantially correspond to the process variables under which the actual SCR $NO_x$ conversion was determined. The device service can include increasing the exhaust gas temperature or initiating an active regeneration of the particulate filter device.

19 Claims, 4 Drawing Sheets

(51) Int. Cl.
| | |
|---|---|
| *B01D 53/94* | (2006.01) |
| *B01D 53/96* | (2006.01) |
| *F01N 11/00* | (2006.01) |
| *F01N 13/00* | (2010.01) |
| *F01N 3/021* | (2006.01) |
| *F01N 3/023* | (2006.01) |
| *F01N 3/027* | (2006.01) |
| *F01N 3/035* | (2006.01) |

(52) U.S. Cl.
CPC ............. *B01D 53/96* (2013.01); *F01N 3/021* (2013.01); *F01N 3/023* (2013.01); *F01N 3/027* (2013.01); *F01N 3/035* (2013.01); *F01N 3/208* (2013.01); *F01N 3/2013* (2013.01); *F01N 3/2066* (2013.01); *F01N 9/00* (2013.01); *F01N 11/00* (2013.01); *F01N 13/009* (2014.06); *B01D 2257/404* (2013.01); *F01N 2260/04* (2013.01); *F01N 2550/02* (2013.01); *F01N 2550/05* (2013.01); *F01N 2610/02* (2013.01); *F01N 2900/04* (2013.01); *F01N 2900/0402* (2013.01); *F01N 2900/102* (2013.01); *F01N 2900/1402* (2013.01); *F01N 2900/1404* (2013.01); *F01N 2900/1602* (2013.01); *F01N 2900/1606* (2013.01); *F01N 2900/1612* (2013.01); *F01N 2900/1616* (2013.01); *F01N 2900/1621* (2013.01); *F01N 2900/1622* (2013.01); *F01N 2900/1806* (2013.01); *Y02A 50/2324* (2018.01); *Y02A 50/2325* (2018.01); *Y02T 10/22* (2013.01); *Y02T 10/24* (2013.01); *Y02T 10/26* (2013.01); *Y02T 10/47* (2013.01)

(58) Field of Classification Search
CPC ........ F01N 11/00; F01N 13/009; F01N 3/021; F01N 3/023; F01N 3/027; F01N 3/035; F01N 3/2013; F01N 3/2066; F01N 3/208; F01N 9/00; F01N 2260/04; F01N 2550/02; F01N 2550/05; F01N 2610/02; F01N 2900/04; F01N 2900/0402; F01N 2900/102; F01N 2900/1402; F01N 2900/1404; F01N 2900/1602; F01N 2900/1606; F01N 2900/1612; F01N 2900/1616; F01N 2900/1621; F01N 2900/1622; F01N 2900/1806
See application file for complete search history.

(56) References Cited

U.S. PATENT DOCUMENTS

| | | | |
|---|---|---|---|
| 2012/0041596 A1* | 2/2012 | Thompson | F01N 3/103 700/271 |
| 2015/0101310 A1* | 4/2015 | Kowalkowski | F01N 3/0885 60/274 |
| 2015/0218991 A1* | 8/2015 | Chavannavar | F01N 3/208 423/239.1 |
| 2015/0322837 A1* | 11/2015 | Takada | F01N 3/106 422/111 |

* cited by examiner

METHOD FOR CONTROLLING AN EXHAUST GAS TREATMENT SYSTEM

INTRODUCTION

During a combustion cycle of an internal combustion engine (ICE), air/fuel mixtures are provided to cylinders of the ICE. The air/fuel mixtures are compressed and/or ignited and combusted to provide output torque. After combustion, pistons of the ICE force exhaust gases in the cylinders out through exhaust valve openings and into an exhaust system. The exhaust gas emitted from an ICE, particularly a diesel engine, is a heterogeneous mixture that contains gaseous emissions such as carbon monoxide (CO), unburned hydrocarbons and oxides of nitrogen ($NO_x$) as well as condensed phase materials (liquids and solids) that constitute particulate matter. Reduction of $NO_x$ emissions from an exhaust feed stream containing excess oxygen is a challenge for vehicle manufacturers.

Exhaust gas treatment systems may employ catalysts in one or more components configured for accomplishing an after-treatment process such as reducing $NO_x$ to produce more tolerable exhaust constituents of nitrogen ($N_2$) and water ($H_2O$). One type of exhaust treatment technology for reducing $NO_x$ emissions is a selective catalytic reduction (SCR) device, which generally includes a substrate or support with a catalyst compound disposed thereon. Passing exhaust over the catalyst converts certain or all exhaust constituents in desired compounds, such as non-regulated exhaust gas components. A reductant is typically sprayed into hot exhaust gases upstream of the SCR, decomposed into ammonia, and absorbed by the SCR device. The ammonia then reduces the $NO_x$ to nitrogen and water in the presence of the SCR catalyst.

A particulate filter (PF) located upstream and/or downstream the SCR can be utilized to capture soot, and that soot may be periodically incinerated during regeneration cycles. Water vapor, nitrogen and reduced emissions thereafter exit the exhaust system. A PF and SCR can be integrated as a selective catalytic reduction filter (SCRF).

SUMMARY

According to an aspect of an exemplary embodiment, a method for controlling an exhaust gas treatment system is provided. The exhaust gas treatment system can include an exhaust gas stream supplied by an exhaust gas source to a selective catalytic reduction device and a particulate filter device. The particulate filter device can be upstream of the selective catalytic reduction device. Additionally or alternatively, the exhaust gas treatment system includes an exhaust gas stream supplied by an exhaust gas source to a selective catalytic reduction filter device. The exhaust gas source can include an ICE, such as a gasoline or diesel ICE. The method for controlling an exhaust gas treatment system includes detecting a threshold level of reductant deposits proximate the SCR device, and initiating a selective catalytic reduction device service in response thereto. The method can further include satisfying a secondary condition prior to initiating a selective catalytic reduction device service. The selective catalytic reduction device service can include increasing the exhaust gas temperature, or an active regeneration of the particulate filter.

According to an aspect of an exemplary embodiment, a method for detecting a threshold level of reductant deposits includes determining an actual SCR $NO_x$ conversion using measured process variables; and comparing the actual SCR $NO_x$ conversion to a calibrated $NO_x$ conversion value to determine a $NO_x$ conversion discrepancy. The calibrated $NO_x$ conversion value can determined using exhaust gas flow and system temperature values which substantially correspond to the process variables under which the actual SCR $NO_x$ conversion was determined. Comparing the actual SCR $NO_x$ conversion to the calibrated $NO_x$ conversion value can include comparing several corresponding actual SCR $NO_x$ conversion values and calibrated $NO_x$ conversion values over a period of time.

Although many of the embodiments herein are describe in relation to ammonia reductants used within $NO_x$ selective catalytic reduction devices, the embodiments herein are generally suitable for selective catalytic reduction device alternatives utilizing various reductants which can accumulate and cause device failure.

Other objects, advantages and novel features of the exemplary embodiments will become more apparent from the following detailed description of exemplary embodiments and the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Selective catalytic reduction (SCR) devices are commonly utilized to treat exhaust gas for vehicles powered by ICEs. Accurately identifying a need for SCR device regeneration not only imparts greater convenience and utility to the operator of a vehicle, but can also enhance the performance of the vehicle itself. For example, manufacturers of ICEs develop engine operation control strategies to satisfy customer demands and meet various regulations for emission control and fuel economy. One such engine control strategy comprises operating an engine at an air/fuel ratio that is lean of stoichiometry to improve fuel economy and reduce greenhouse gas emissions. Such operation is possible using both compression-ignition (diesel) and spark-ignition engines. When an engine operates with lean (excess oxygen) air/fuel ratio, the resultant combustion conditions (e.g., temperature, excess oxygen) leads to higher engine-out $NO_x$. The embodiments herein allow a vehicle to achieve both improved fuel economy and reduced greenhouse gas emissions while extending periods between SCR regeneration.

The following description is merely exemplary in nature and is not intended to limit the present disclosure, its application or uses. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 1A:
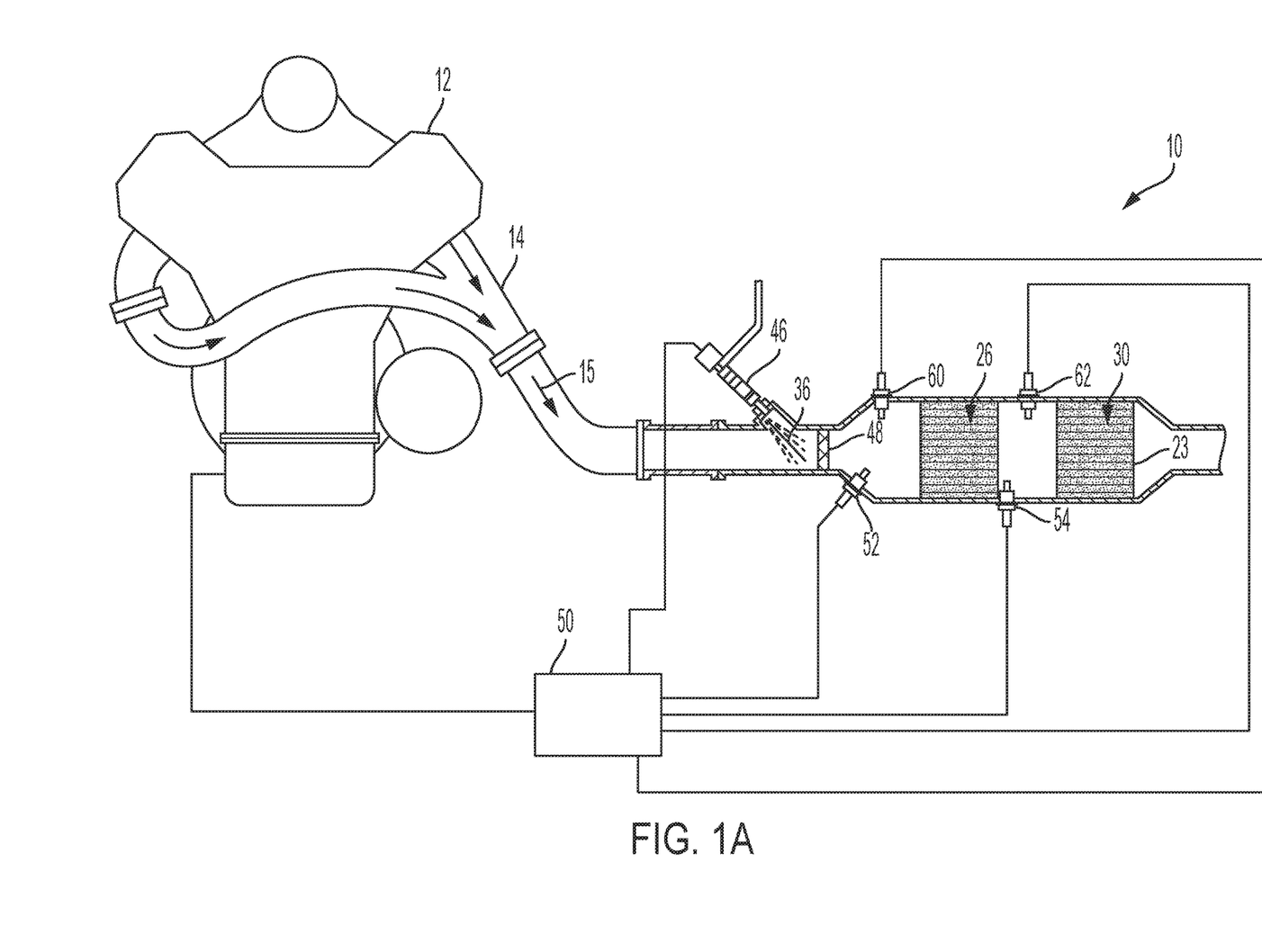
FIG. 1A shows a schematic for an exhaust gas treatment system, according to one or more embodiments.

Referring now to FIG. 1A, an exemplary embodiment is directed to an exhaust gas treatment system 10, for the reduction of regulated exhaust gas constituents of an ICE 12. The exhaust gas treatment system 10 described herein can be implemented in various engine systems that can include, but are not limited to, diesel engine systems, gasoline direct injection systems, and homogeneous charge compression ignition engine systems. The engines will be described herein for use in generating torque for vehicles, yet other non-vehicular applications are within the scope of this disclosure. Therefore when reference is made to a vehicle, such disclosure should be interpreted as applicable to any application of an ICE. Moreover, ICE 12 can generally represent any device capable of generating an exhaust gas stream 15 comprising $NO_x$ species, and the disclosure herein should accordingly be interpreted as applicable to all such devices. It should be further understood that the embodiments disclosed herein may be applicable to treatment of effluent streams not comprising $NO_x$ species, and, in such instances, ICE 12 can also generally represent any device capable of generating an effluent stream comprising not comprising NOx species.

The exhaust gas treatment system 10 generally includes one or more exhaust gas conduits 14, and one or more exhaust treatment devices. The exhaust gas conduit 14, which can comprise several segments, transports exhaust gas 15 from the ICE 12 to the various exhaust treatment devices of the exhaust gas treatment system 10. In some exemplary embodiments, exhaust gas 15 can comprise $NO_x$ species. As used herein, "$NO_x$" refers to one or more nitrogen oxides. $NO_x$ species can include $N_yO_x$ species, wherein y>0 and x>0. Non-limiting examples of nitrogen oxides can include NO, $NO_2$, $N_2O$, $N_2O_2$, $N_2O_3$, $N_2O_4$, and $N_2O_5$.

In the embodiment as illustrated, the exhaust gas treatment system 10 devices include a SCR device 26, and a particulate filter device (PF) device 30. The implementation shown provides the PF device 30 in a common housing with the SCR catalyst 124, yet this implementation is optional and implementations providing discrete housings for the SCR catalyst 124 and PF device 30 are suitable. Further, the PF device 30 can be disposed upstream of the SCR device 26 in many embodiments. As can be appreciated, the exhaust gas treatment system 10 of the present disclosure can include various combinations of one or more of the exhaust treatment devices shown in FIG. 1A, and/or other exhaust treatment devices (not shown), and is not limited to the present example. For example, the exhaust gas treatment system 10 can optionally include an oxidation catalyst (OC) device (not shown), a flow-through container of absorbent particles (not shown), an electrically heated catalyst (EHC) device (not shown), and combinations thereof. Exhaust gas treatment system 10 can further include a control module 50 operably connected via a number of sensors to monitor the engine 12 and/or the exhaust gas treatment system 10.

The optional OC device disclosed above can include, for example, a flow-through metal or ceramic monolith substrate that can be packaged in a stainless steel shell or canister having an inlet and an outlet in fluid communication with exhaust gas conduit 14. The substrate can include an oxidation catalyst compound disposed thereon. The oxidation catalyst compound can be applied as a wash coat and can contain platinum group metals such as platinum (Pt), palladium (Pd), rhodium (Rh) or other metal oxide catalysts such as perovksites, or combination thereof. The OC device is useful in treating unburned gaseous and non-volatile unburned hydrocarbons and CO, which are oxidized to form carbon dioxide and water. In some embodiments an OC device, such as a diesel oxidation catalyst (DOC) device, can be positioned upstream of the SCR to convert NO into $NO_2$ for preferential treatment in the SCR.

The optional flow-through container of absorbent particles disclosed above can be located downstream of an optional OC device. The flow-through container of absorbent particles can include, for example, a flow-through metal or ceramic monolith substrate that can be packaged in a stainless steel shell or canister having an inlet and an outlet in fluid communication with exhaust gas conduit 14. The substrate can include a washcoat of water absorbent particles such as, for example, alumina particles, activated carbon particles, water absorbent zeolite materials, water absorbent molecular sieve materials, and metal-organic frameworks ("MOF") materials. Specifically, the water absorbent particles are configured for temporarily storing water collected from the exhaust gas 15 below a threshold temperature. In one embodiment, the threshold temperature is about 100° C. The exhaust gas 15 warms the flow-through container of absorbent particles to the threshold temperature. Once the flow-through container of absorbent particles reaches the threshold temperature, substantially all of the water that has been absorbed is released.

The optional EHC device disclosed above can be disposed downstream of both an OC device and a flow-through container of absorbent particles. The EHC device includes a monolith and an electrical heater, where the electrical heater is selectively activated and heats the monolith. The electrical heater is connected to an electrical source that provides power thereto. The EHC device can be constructed of any suitable material that is electrically conductive such as the wound or stacked metal monolith. An oxidation catalyst compound can be applied to the EHC device as a wash coat and can contain platinum group metals such as platinum ("Pt"), palladium ("Pd"), rhodium ("Rh") or other suitable oxidizing catalysts, or combination thereof.

The SCR device 26 can be disposed downstream of the ICE 12. In some embodiments, the SCR device 26 can be disposed downstream of the optional EHC device, the optional flow-through container of absorbent particles, the optional OC device, and combinations thereof. In general, the SCR device 26 includes all devices which utilize a reductant 36 and a catalyst to NO and $NO_2$ to harmless components. The SCR device 26 can include, for example, a flow-through ceramic or metal monolith substrate that can be packaged in a stainless steel shell or canister having an inlet and an outlet in fluid communication with the exhaust gas conduit 14. The substrate can include a SCR catalyst composition applied thereto. The SCR catalyst composition is generally a porous and high surface area material which can operate efficiently to convert $NO_x$ constituents in the exhaust gas 15 in the presence of a reductant 36, such as ammonia. For example, the catalyst composition can contain a zeolite and one or more base metal components such as iron (Fe), cobalt (Co), copper (Cu) or vanadium (V), sodium (Na), barium (Ba), titanium (Ti), tungsten (W), copper (Cu), and combinations thereof. In some embodiments the zeolite can be a β-type zeolite, a Y-type zeolite, a ZM5 zeolite, or any other crystalline zeolite structure such as a Chabazite or a USY (ultra-stable Y-type) zeolite. Suitable SCR catalyst compositions can have high thermal structural stability when used in tandem with PF device 30 which are regenerated via high temperature exhaust soot burning.

The SCR catalyst composition can be washcoated onto a substrate body that is housed within a canister that fluidly communicates with the exhaust gas conduit 14 and optionally other exhaust treatment devices. The substrate body can, for example, be a ceramic brick, a plate structure, or any other suitable structure such as a monolithic honeycomb structure that includes several hundred to several thousand parallel flow-through cells per square inch, although other configurations are suitable. Each of the flow-through cells can be defined by a wall surface on which the SCR catalyst composition can be washcoated. The substrate body can be formed from a material capable of withstanding the temperatures and chemical environment associated with the exhaust gas 15. Some specific examples of materials that can be used include ceramics such as extruded cordierite, α-alumina, silicon carbide, silicon nitride, zirconia, mullite, spodumene, alumina-silica-magnesia, zirconium silicate, sillimanite, petalite, or a heat and corrosion resistant metal such as titanium or stainless steel.

The SCR device 26 generally uses a reductant 36 to reduce $NO_x$ species (e.g., NO and $NO_2$) to harmless components. Harmless components include one or more of species which are not $NO_x$ species, diatomic nitrogen, nitrogen-containing inert species, or species which are considered acceptable emissions, for example. The reductant 36 can be ammonia ($NH_3$), such as anhydrous ammonia or aqueous ammonia, or generated from a nitrogen and hydrogen rich substance such as urea ($CO(NH_2)_2$). Additionally or alternatively, the reductant 36 can be any compound capable of decomposing or reacting in the presence of exhaust gas 15 to form ammonia. Equations (1)-(5) provide exemplary chemical reactions for $NO_x$ reduction involving ammonia.

$$6NO+4NH_3 \rightarrow 5N_2+6H_2O \qquad (1)$$

$$4NO+4NH_3+O_2 \rightarrow 4N_2+6H_2O \qquad (2)$$

$$6NO_2+8NH_3 \rightarrow 7N_2+12H_2O \qquad (3)$$

$$2NO_2+4NH_3+O_2 \rightarrow 3N_2+6H_2O \qquad (4)$$

$$NO+NO_2+2NH_3 \rightarrow 2N_2+3H_2O \qquad (5)$$

It should be appreciated that Equations (1)-(5) are merely illustrative, and are not meant to confine the SCR device 26 to a particular $NO_x$ reduction mechanism or mechanisms, nor preclude the operation of other mechanisms. The SCR device 26 can be configured to perform any one of the above $NO_x$ reduction reactions, combinations of the above $NO_x$ reduction reactions, and other $NO_x$ reduction reactions.

The reductant 36 can be diluted with water in various implementations. In implementations where the reductant 36 is diluted with water, heat (e.g., from the exhaust) evaporates the water, and ammonia is supplied to the SCR device 26. Non-ammonia reductants can be used as a full or partial alternative to ammonia as desired. In implementations where the reductant 36 includes urea, the urea reacts with the exhaust to produce ammonia, and ammonia is supplied to the SCR device 26. The SCR device 26 can store (i.e., absorb, and/or adsorb) ammonia supplied by the reductant 36 for interaction with exhaust gas 15. Reaction (6) below provides an exemplary chemical reaction of ammonia production via urea decomposition.

$$CO(NH_2)_2+H_2O \rightarrow 2NH_3+CO_2 \qquad (6)$$

It should be appreciated that Equation (6) is merely illustrative, and is not meant to confine the urea or other reductant 36 decomposition to a particular single mechanism, nor preclude the operation of other mechanisms.

A reductant 36 can be supplied from a reductant supply source (not shown) and injected into the exhaust gas conduit 14 at a location upstream of the SCR device 26 using an injector 46, or other suitable method of delivery of the reductant 36 to the exhaust gas 15. The reductant 36 can be in the form of a gas, a liquid, or an aqueous solution, such as an aqueous urea solution. The reductant 36 can be mixed with air in the injector 46 to aid in the dispersion of the injected spray. A mixer or turbulator 48 can also be disposed within the exhaust conduit 14 in close proximity to the injector 46 to further assist in thorough mixing of the reductant 36 with the exhaust gas 15 and/or even distribution throughout the SCR device 26.

In some embodiments, two or more SCR devices can be oriented in series relative to the flow of exhaust gas 15, and configured such that a portion of a reductant 36 can slip or pass through an upstream SCR device 26 and be received by at least one downstream SCR device. In such a configuration, "ammonia slip" can be implemented as an intentional design aspect. However, ammonia slip can also occur when ammonia passes through a SCR device 26 un-reacted as a result of over-injection of ammonia into the exhaust conduit 14, low exhaust gas 15 temperatures whereat ammonia will not react, or a degraded SCR catalyst.

The PF device 30 can be disposed downstream of the SCR device 26, as shown, or can be disposed upstream of the SCR device 26. For example only, the PF device 30 can include a diesel particulate filter (DPF). The PF device 30 operates to filter the exhaust gas 15 of carbon, soot, and other particulates. The PF device 30 includes a filter 23. For example only, the PF device 30 can be constructed using a ceramic or SiC wall flow monolith filter 23 that can be packaged in a shell or canister constructed of, for example, stainless steel, and that has an inlet and an outlet in fluid communication with exhaust gas conduit 14. It is appreciated that the ceramic or SiC wall flow monolith filter is merely exemplary in nature and that the PF device 30 can include other filter devices such as wound or packed fiber filters, open cell foams, sintered metal fibers, etc. The ceramic or SiC wall flow monolith filter 23 can have a plurality of longitudinally extending passages that are defined by longitudinally extending walls. The passages include a subset of inlet passages that have an open inlet end and a closed outlet end, and a subset of outlet passages that have a closed inlet end and an open outlet end. Exhaust gas 15 entering the filter 23 through the inlet ends of the inlet passages is forced to migrate through adjacent longitudinally extending walls to the outlet passages. It is through this wall flow mechanism that the exhaust gas 15 is filtered of carbon and other particulates. The filtered particulates are deposited on the longitudinally extending walls of the inlet passages and, over time, will have the effect of increasing the exhaust gas 15 backpressure experienced by the IC engine 12.

Figure 1B:
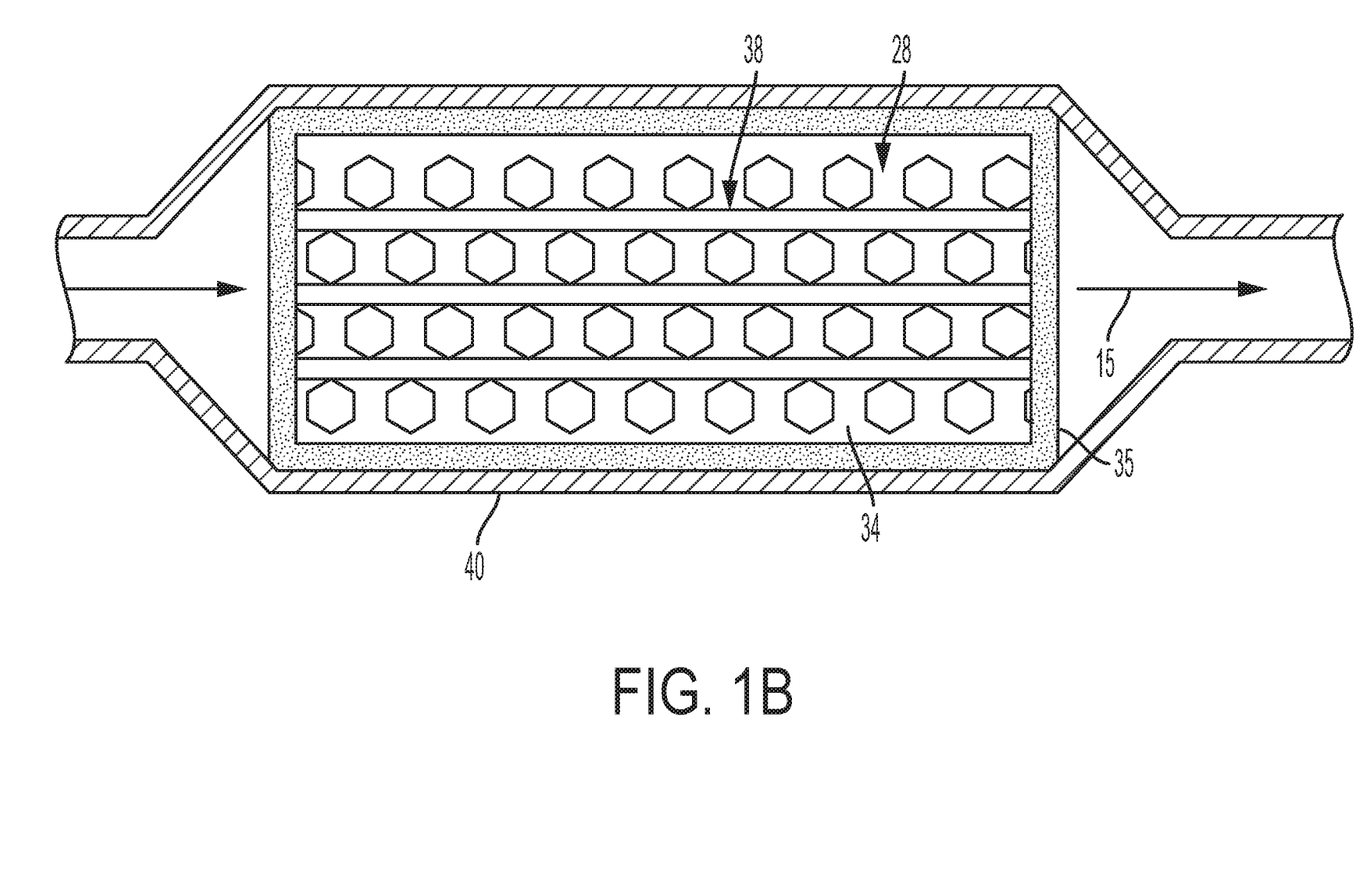
FIG. 1B illustrates a selective catalytic reduction filter device, according to one or more embodiments.

In some embodiments, exhaust treatment system 10 can further include a selective catalytic reduction filter (SCRF) device. In some embodiments, exhaust treatment system 10 can include a SCRF device as an alternative to a SCR device 26 and a PF device 30. FIG. 1B illustrates a SCRF device 40, which can include a carrier or substrate 34 that is dipped into a washcoat 35 containing an active catalytic component 28, i.e., the catalyst 28. Generally, the washcoat 35 can be applied to or coated on a surface of the substrate 34 for absorbing the reductant 35 (not shown). The substrate 34 can be porous and the washcoat 35 can be applied or coated on the surface of the substrate 34 within the pores. The substrate 34 can comprise similar structures and materials as the SCR device 26 as described above, or any other suitable structure. For example, the substrate 34 can be formed of silicon carbide (SiC), cordierite or any other suitable substrate being highly porous. In operation of the SCRF device 40, reductant 36 (not shown) can be applied as in the SCR device 26 using reductant injector 46 (not shown) and optionally the turbulator 48 (not shown). When applied, reductant 36 is generally disposed on the washcoat 35, such as through adsorption and/or absorption, for interaction with exhaust gas 15. As exhaust gas 15 passes through the SCRF device 40, particulate matter emitted from the engine 12 can collect in the SCRF device 40. Therefore, the SCRF device 40 can include a particulate filter, such as filter 38, for collecting the particulate matter. It should be understood that the description provided of SCRF device 40 is not meant to restrict the definition of a SCRF device, nor preclude the use of various additional or alternative SCRF designs in conjunction with the embodiments described herein.

Over time, filter devices such as PF device 30 and/or SCRF device 40 can accumulate particulate matter and must be regenerated. Accumulation of particular matter can degrade the efficiency of a PF device 30 or a SCRF device 40, for example. Regeneration generally involves the oxidation or burning of the accumulated particulate matter in the PF device 30 and/or the SCRF device 40. For example, carbonaceous soot particulates can be oxidized during the regeneration process to produce gaseous carbon dioxide. In many instances, regeneration comprises increasing exhaust gas 15 temperature. Increasing exhaust gas 15 temperature can be achieved by a number of methods, such as adjusting engine calibration parameters. One or more regeneration techniques can be implemented when a PF device 30 and/or SCRF device 40 has accumulated a determined amount of particulate matter, for example. A determined amount of particulate matter can be set based on weight, percentage capacity of the PF device 30, or based on other factors, for example. One or more regeneration techniques can be implemented at random times, or at prescribed intervals, for example.

Regeneration can include normal operation of a vehicle which generates exhaust gas 15 of a sufficient temperature to clear the PF device 30 and/or the SCRF device 40 of some or all accumulated particulate matter. Additionally or alternatively, regeneration can include utilizing the optional EHC to impart heat to the exhaust gas treatment system 10 and clear the PF device 30 and/or the SCRF device 40 of some or all accumulated particulate matter. Additionally or alternatively, regeneration can include utilizing an oxidizing catalyst, such as optional OC device described above. When post-combustion injected fuel is expelled from the ICE 12 with the exhaust gas 15 and contacted with the oxidizing catalyst, heat released during fuel oxidation is imparted to the exhaust gas treatment system 10 to clear the PF device 30 and/or the SCRF device 40 of some or all accumulated particulate matter. It should be appreciated that the above regeneration techniques are merely illustrative, and are not meant to preclude the use or suitability of other additional or alternative regeneration techniques. PF device 30 and/or the SCRF device 40 regeneration techniques can be classified as active or passive regeneration, as will be described below.

The control module 50 is operably connected to the engine 12 and the reductant injector 46. The control module 50 can further be operably connected to the optional exhaust treatment devices described above. FIG. 1 illustrates the control module 50 in communication with two temperature sensors 52 and 54 located in the exhaust gas conduit 14. The first temperature sensor 52 is located upstream of the SCR device 26, and the second temperature sensor 54 is located downstream of the SCR device 26. The temperature sensors 52 and 54 send electrical signals to the control module 50 that each indicate the temperature in the exhaust gas conduit 14 in specific locations. The control module 50 is also in communication with two $NO_x$ sensors 60 and 62 that are in fluid communication with the exhaust gas conduit 14. Specifically, the first upstream $NO_x$ sensor 60 is located downstream of the ICE 12 and upstream of the SCR device 26 to detect a $NO_x$ concentration level. The second downstream $NO_x$ sensor 62 is located downstream of the SCR device 26 to detect the $NO_x$ concentration level in the exhaust gas conduit 14 in specific locations. In all such embodiments, the SCR device 26 can comprise a SCRF device 40.

The precise amount of injected mass of reductant 36 is important to maintain exhaust gas 15, and particularly $NO_x$, emissions, at an acceptable level. A reductant 36 injection dosing rate (e.g., grams per second) can be determined by one or more criteria such as $NO_x$ concentration upstream of a SCR device 26 and/or a SCRF device 40, $NO_x$ concentration downstream of a SCR device 26 and/or a SCRF device 40, downstream ammonia concentration, downstream temperature, torque output of engine 12, exhaust flow rate, exhaust pressure, engine 12 speed (e.g., rpm), engine 12 air intake, other suitable criteria, and combinations thereof. For example, upstream $NO_x$ sensor 60 can measure $NO_x$ in the exhaust at a location upstream of the SCR device 26 and/or the SCRF device 40. For example only, the upstream $NO_x$ sensor 60 can measure a mass flowrate of $NO_x$ (e.g., grams per second), a concentration of $NO_x$ (e.g., parts per million), or another suitable measure of the amount of $NO_x$. In this example, the upstream $NO_x$ concentration can be used to determine a suitable reductant 36 injection dosing rate. Additionally or alternatively, the reductant 36 dosing rate can be determined based upon temperature of the exhaust 15 or other system 10 components. For example, temperature sensor 54 can measure temperature of the exhaust downstream of the SCR device 26 and/or the SCRF device 40. The temperature sensor 54 can generate a temperature signal based on the temperature of the exhaust downstream of the SCR device 26 and/or the SCRF device 40 and communicate the same to control module 50. The exhaust gas 15 and the SCR and/or SCRF catalyst temperature affect the operation of the SCR and/or SCRF system. Catalytic conversion of $NO_x$ decreases at decreasing temperatures, and therefore reductant 36 dosing can be reduced or halted to prevent emissions of ammonia and other urea decomposition products and prevent reductant 36 deposits on system components. For example, a low temperature cut-off point for reductant 36 injection can be at about 200° C. to about 250° C.

In general, a reductant 36 dosing rate can be continuously determined by the control module 50 using one or more criteria, such as the criteria described above. In continuously determining a reductant 36 dosing rate, a dosing adaptation can be initiated wherein the reductant 36 dosing rate is increased or decreased. For example, the reductant 36 dosing rate can be adapted to achieve a desired $NO_x$ concentration or flow rate in exhaust gas 15 downstream of the SCR device 26 and/or the SCRF device 40, or achieve a desired SCR device 26 and/or the SCRF device 40 $NO_x$ conversion rate. The downstream $NO_x$ sensor 62 can be cross-sensitive to ammonia and, therefore, the output $NO_x$ signal can also reflect ammonia in the exhaust downstream of the SCR device 26 and/or the SCRF device 40. The downstream $NO_x$ sensor 62 can generate an output $NO_x$ and/or ammonia signal based on the $NO_x$ and/or ammonia in the exhaust downstream of the SCR device 26 and/or the SCRF device 40 and communicate the same to control module 50. Accordingly, a dosing adaptation can be initiated in order to achieve a desired $NO_x$ exhaust concentration, for example. In some embodiments, such dosing adaptations are only initiated above a low temperature cut-off point. A dosing adaptation can be initiated continually or at prescribed intervals. Additionally or alternatively, a dosing adaptation can be initiated in response to a specific event or set of conditions.

During use of a SCR device 26 and/or a SCRF device 40, reductant 36 deposits form on one or more of the exhaust conduit 14, reductant injector 46, turbulator 48, SCR device 26 and/or SCRF device 40 and inhibit conversion of $NO_x$ species. Reductant 36 deposits can include, for example, accumulation of the reductant 36 and/or its decomposition and/or reaction products such as ammonia, ammonium nitrate, ammonium sulfate, unhydrolyzed urea, and melamine. In such instances, an initiated dosing adaptation can be attributed to the reductant 36 deposits. Dosing adaptations which increase a reductant 36 dose in response to reductant 36 deposits can further decrease SCR device 26 and/or SCRF device 40 performance and increase ammonia slip, among other problems, as a result of exacerbated reductant 36 deposits. Because reductant 36 deposits cannot be reliably tied purely to vehicle mileage or ICE 12 operating times, SCR device 26 and/or SCRF device 40 servicing can be unnecessarily initiated to mitigate potential SCR device 26 and/or SCRF device 40 failures.

In some instances, PF device 30 and/or the SCRF device 40 regeneration has been found to reduce or eliminate reductant 36 deposits, for example by raising temperatures in or proximate to the SCR device 26. PF device 30 and/or the SCRF device 40 regeneration techniques which appreciably or suitably reduce or eliminate reductant 36 deposits can be referred to as active regeneration techniques. PF device 30 and/or the SCRF device 40 regeneration techniques which do not appreciably or suitably reduce or eliminate reductant 36 deposits can be referred to as passive regeneration techniques. Accordingly, where a PF device 30 and/or the SCRF device 40 undergoes high passive regeneration and/or fails to initiate sufficient active regeneration to suitably reduce or eliminate reductant 36 deposits, excessive reductant 36 deposits can cause SCR device 26 and/or SCRF device 40 failure. Exhaust gas treatment systems which orient the PF device upstream of the SCR device can exhibit very high PF passive regeneration, for example. Some SCRF devices similarly exhibit high passive regeneration.

Sufficient active regeneration can be defined by the frequency of active regeneration, or the magnitude (e.g., temperature) of active regeneration. Suitable reduction or elimination of reductant 36 deposits can be defined as a reduction or elimination of reductant 36 deposits sufficient to prevent a SCR device 26 and/or SCRF device 40 failure, or delay SCR device 26 and/or SCRF device 40 failure for a defined period of use. A SCR device 26 and/or SCRF device 40 failure can include reductant injector 46 clogging, failure to maintain a desired $NO_x$ species conversion rate, and/or a failure to prevent ammonia slip from reaching a threshold (e.g., grams of ammonia passing through a SCR device 26 and/or SCRF device 40 unreacted per unit time or per unit volume of exhaust gas 15).

In some embodiments, active and passive regeneration can be defined by the amount of heat applied to reductant deposits 36, or the temperature achieved by reductant 36 deposits via an application of heat. Applying heat to reductant 36 deposits can include both direct and indirect applications of heat. For example, passive regeneration can occur over temperature ranges of about 250° C. to about 450° C., whereas active regeneration can occur at temperatures above about 500° C., or over temperature ranges between about 500° C. and about 650° C. It should be appreciated that these temperatures ranges are merely illustrative, and are not meant to confine active and passive regeneration techniques to a particular range of temperatures, or necessarily impose a requirement that active and passive regeneration techniques must be defined by temperature ranges. For example, active regeneration can occur at temperatures above 300° C. Further, if temperature range is used to define active and passive regeneration, one of skill in the art will recognize that temperatures will vary based on a variety of factors such as the application of the exhaust gas treatment system 10 (e.g., a vehicular application), the reductant 36 utilized, the nature and composition of the reductant 36 deposits, and the geometry and components of the SCR device 26 and/or SCRF device 40, among many others.

In an example, normal operation of a vehicle can be classified as passive regeneration when exhaust gas 15 temperatures are suitable for regenerating the PF device 30 and/or SCRF device 40, but do not appreciably or suitably reduce or eliminate reductant 36 deposits. In such an example, normal operation of a vehicle can occur at low speeds, for short durations, and/or during cold weather. Conversely, normal operation of a vehicle can be classified as active regeneration when exhaust gas 15 temperatures can appreciably or suitably reduce or eliminate reductant 36 deposits. In such an example, normal operation of a vehicle can occur at high speeds, for long durations, and/or during warm weather.

In an example, utilizing the optional EHC device can be classified as passive regeneration when the EHC device does not impart heat to reductant 36 deposits, or any heat imparted to reductant 36 deposits by the EHC device does not appreciably or suitably reduce or eliminate reductant 36 deposits. In such an example, the EHC device can be positioned downstream of the SCR device 26 and/or SCRF device 40. Conversely, utilizing the optional EHC device can be classified as active regeneration when the EHC device imparts a sufficient amount of heat to reductant 36 deposits which appreciably or suitably reduces or eliminates reductant 36 deposits. In such an example, the EHC device can be positioned upstream of or proximate to the SCR device 26 and/or SCRF device 40.

In an example, utilizing the optional OC device can be classified as passive regeneration when the OC device does not impart heat to reductant 36 deposits, or any heat imparted to reductant 36 deposits by the OC device does not appreciably or suitably reduce or eliminate reductant 36 deposits. In such an example, the OC device can be positioned downstream of the SCR device 26 and/or SCRF device 40. Conversely, utilizing the optional OC device can be classified as active regeneration when the OC device imparts a sufficient amount of heat to reductant 36 deposits which appreciably or suitably reduces or eliminates reductant 36 deposits. In such an example, the OC device can be positioned upstream of or proximate to the SCR device 26 and/or SCRF device 40.

Because various PF device 30 and/or SCRF device 40 regeneration techniques can be classified as both passive an active, and/or because high passive regeneration of a PF device 30 and/or SCRF device 40 may not trigger a need for active regeneration, and/or because there is no reliable predictor for active regeneration occurrence, PF device 30 and/or SCRF device 40 regeneration and vehicle mileage are not reliable discrete variables for preventing SCR device 26 and/or SCRF device 40 failure via active regeneration. In particular, vehicles equipped with exhaust gas treatment systems utilizing a PF device upstream of a SCR device and/or a SCRF device can exhibit high passive regeneration are capable of operating for long distances and/or times between PF device active regenerations. For example, a diesel engine-powered vehicle utilizing PF devices upstream of a SCR device and/or a SCRF device can operate for more than 3,000 miles without requiring or triggering a PF device active regeneration.

Figure 2A:
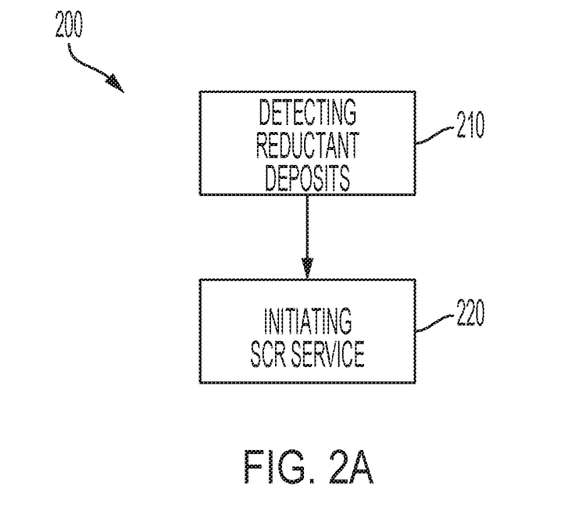
FIG. 2A illustrates a method for controlling exhaust gas treatment systems, according to one or more embodiments.

FIG. 2A illustrates a method 200 for controlling an exhaust gas treatment system, including detecting 210 a threshold level of reductant deposits proximate the SCR device, and initiating 220 a SCR device service in response thereto. The reductant injector and some portions of the exhaust gas conduit can be considered proximate the SCR device, in some embodiments. A threshold level of reductant deposit can comprise a minimum reductant deposit threshold. The reductant deposit threshold can be defined as a mass of accumulated deposits, as a thickness of deposits on a particular location (e.g., proximate injector 46), and/or as a $NO_x$ conversion discrepancy as will be described below, for example. A SCR device can comprise one or more of a SCR device and a SCRF device, although optionally both a SCR device and a SCRF device can be utilized. A SCR device, including a SCRF device, operate utilizing reductant, as described above. The exhaust gas treatment system can comprise an exhaust gas stream supplied by an exhaust gas source to one or more of a SCR devices, and a PF device. A PF device can be upstream or downstream of one or more SCR devices. The exhaust gas treatment system can comprise two or more PF devices located upstream of a SCR device and/or a SCRF device, downstream of a SCR device and/or a SCRF device, or combinations thereof. In some embodiments where the SCR device comprises a SCRF device, the discrete PF device can be considered optional and can be omitted from the system. The exhaust gas source can comprise an ICE, for example. The ICE can power a vehicle. The exhaust gas stream can include one or more $NO_x$ species.

Figure 2B:
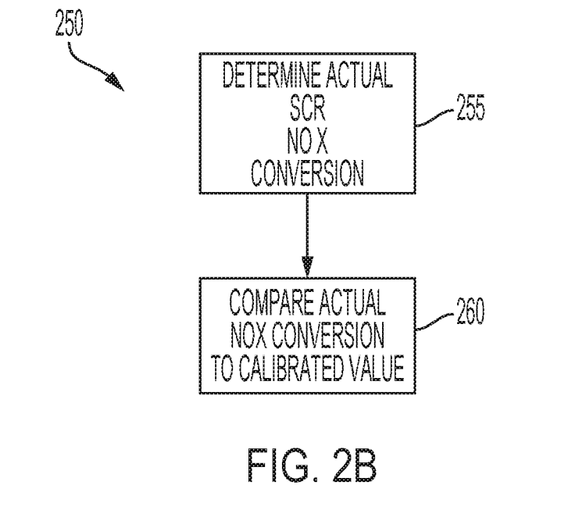
FIG. 2B illustrates a flowchart for a reductant deposit model, according to one or more embodiments.

Detecting 210 a threshold level of reductant deposits can be accomplished by utilizing a reductant deposit model. Additionally or alternatively, a threshold level of reductant deposits can be determined by sensors, or other means. FIG. 2B illustrates a flowchart for a reductant deposit model 250. Model 250 includes determining 255 an actual SCR $NO_x$ conversion and comparing 260 the actual SCR $NO_x$ conversion to a calibrated $NO_x$ conversion value. An actual SCR $NO_x$ conversion is determined using measured process variables. For example, an actual SCR $NO_x$ conversion can be determined 255 using one or more $NO_x$ sensors, such as first upstream $NO_x$ sensor 60 and second downstream $NO_x$ sensor 62, which measure $NO_x$ concentrations upstream and downstream of the SCR device 26, respectively. Additionally or alternatively, other methods capable of providing real-time $NO_x$ conversion can be suitably employed.

A $NO_x$ conversion value refers to the percentage of $NO_x$ species which are converted to one or more of a desired, inert, or otherwise acceptable species (e.g., $N_2$, $H_2O$). A calibrated $NO_x$ conversion value can be determined based upon one or more of system temperature and exhaust flow (e.g., grams/second). System temperature can comprise temperature of the SCR device 26 and/or the exhaust gas 15. Calibrated $NO_x$ conversion values can be represented as a function of process variables (e.g., an exhaust gas flow rate—$NO_x$ conversion efficiency isotherm) or as a matrix. For example, Table 1 below illustrates an example $NO_x$ conversion matrix for an SCR device under various temperature and exhaust flow conditions.

TABLE 1

SCR $NO_x$ Conversion Matrix:

| | | Exhaust Flow [g/s] | | | | |
|---|---|---|---|---|---|---|
| | | 0 | 30 | 50 | 75 | 100 | 125 |
| Temperature [C.] | 150 | 98.6 | 92.9 | 84.1 | 76.2 | 69.7 |
| | 200 | 99.0 | 94.2 | 86.1 | 78.4 | 72.0 |
| | 250 | 99.3 | 95.2 | 87.7 | 80.4 | 74.0 |
| | 300 | 99.5 | 96.0 | 89.1 | 82.1 | 75.8 |
| | 350 | 99.6 | 96.6 | 90.4 | 83.6 | 77.5 |

Calibrated $NO_x$ conversion values can be specific to an SCR device. Calibrated $NO_x$ conversion values can be determined with substantially no reductant deposits proximate the reductant injector, exhaust gas conduit, or SCR device. Calibrated $NO_x$ conversion values can be determined with a normal operating level of reductant deposits proximate the reductant injector, exhaust gas conduit, or SCR device. When comparing 260 the actual SCR $NO_x$ conversion to a calibrated $NO_x$ conversion value, a calibrated value is chosen such that the process variables for which the calibrated $NO_x$ conversion was determined (e.g., temperature and exhaust gas flow rate) are substantially similar to the process variables under which the actual SCR $NO_x$ conversion was measured.

A discrepancy between a measured actual SCR $NO_x$ conversion and a calibrated $NO_x$ conversion value (i.e., a lower actual SCR $NO_x$ conversion relative to a calibrated $NO_x$ conversion value) can indicate the presence of reductant deposits. Such a discrepancy can be translated to a reductant deposit value (e.g., grams of reductant deposit), for example by empirical calibration. Accordingly detecting 210 a threshold level of reductant deposits can comprise comparing a reductant deposit value determined using model 250 to a threshold level of reductant deposit. A threshold level of reductant deposit can be represented as a total weight of accumulated deposits (e.g., 3.0 grams), for example. A threshold level of reductant deposit can be predetermined via theoretical or empirical methods, and/or determined based upon current process variables. For example, the age of the SCR device can be used to modify the threshold level of reductant deposit over time. Additionally or alternatively, the threshold level of reductant deposit can be represented as a $NO_x$ conversion discrepancy, and compared directly to the discrepancy between a measured actual SCR $NO_x$ conversion and a calibrated $NO_x$ conversion value.

Comparing 260 an actual SCR $NO_x$ conversion to a calibrated $NO_x$ conversion value can comprise comparing several corresponding actual SCR $NO_x$ conversion values and calibrated $NO_x$ conversion values over a period of time such that operating noise e.g., temporary device malfunctions, fluctuations in process variables) does not improperly imply the achievement of a reductant deposit threshold. Accordingly, reductant deposit values and/or $NO_x$ conversion discrepancies can be utilized by method 200 as an average value over a given period of time.

When a threshold level of reductant deposits has been detected 210, a SCR device service can be initiated. A SCR device service can comprise replacing the SCR device, increasing exhaust gas temperature, or initiating an active PF device regeneration. In some embodiments, increasing exhaust gas temperature is mutually exclusive from active PF device regeneration (i.e., increasing exhaust gas temperature does not oxidize or burn the accumulated particulate matter in the PF device, or does not appreciably oxidize or burn the accumulated particulate matter in the PF device). Active PF device regeneration can include normally operating the exhaust gas source, utilizing an electrically heated catalyst, and utilizing an oxidizing catalyst device, for example. Active PF device regeneration can include generally increasing exhaust gas temperature, for example. Additionally or alternatively, active PF device regeneration can include other active PF device regeneration methods known in the art and not expressly disclosed herein. Active PF device regeneration can include active regeneration of a discrete PF device, active regeneration of a SCRF device, and combinations thereof.

Figure 2C:
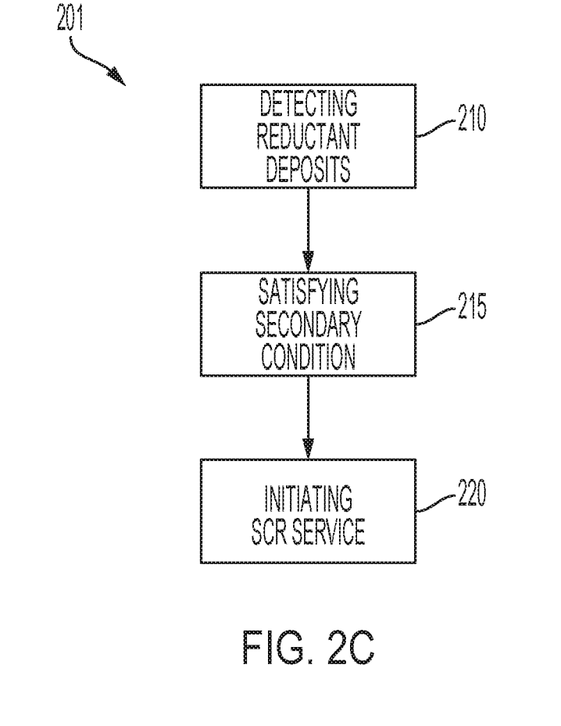
FIG. 2C illustrates a method for controlling exhaust gas treatment systems, according to one or more embodiments.

Method 200 can further include optional features, as shown in FIG. 2C. FIG. 2C illustrates a method 201 for controlling an exhaust gas treatment system, including detecting 210 a threshold level of reductant deposits, satisfying 215 a secondary condition, and initiating 220 a SCR device service in response thereto. A secondary condition can include a minimum mileage threshold for a vehicle powered by the exhaust gas source, a minimum sulfur storage threshold, a minimum SCR device age threshold, a minimum ammonia slip threshold, a minimum duration since the most recent SCR device service threshold, a dosing adaptation, or combinations thereof. The sulfur storage threshold can be defined as a mass of accumulated sulfur within the SCR device. The sulfur storage threshold can be determined by a sulfur storage model, such as a model which operates as a function of one or more of temperature and time. Additionally or alternatively, a sulfur storage threshold can be determined by sensors, or other means. The SCR device age threshold can be determined based on cumulative age measured from first use of the SCR device, or by cumulative operating time of the SCR device. The ammonia slip threshold can be defined as a rate (e.g., 0.5 grams/second) measured downstream of the SCR device, for example. The duration since the most recent SCR device service threshold can comprise one or more of a total elapsed time since the most recent SCR device service, an elapsed operating time of the exhaust gas source since the most recent SCR device service, or an elapsed mileage since the most recent SCR device service where the exhaust gas source powers a vehicle. For example, a secondary condition for initiating an active PF or SCRF regeneration on a vehicle can comprise a 500 mile threshold since the last active regeneration.

A dosing adaptation can comprise an increased reductant dosing rate. For example, a dosing adaptation can comprise an increased reductant dosing rate relative to a baseline reductant dosing rate. A baseline reductant injection dosing rate can be determined as described above, or by other methods. For example, the baseline reductant dosing rate can be determined based on an operating condition of the exhaust gas source, exhaust gas temperature, ambient temperature proximate the exhaust gas treatment system, and combinations thereof. Exhaust gas temperature can be measured upstream from the SCR device. Exhaust gas temperature can be measured in or proximate to the SCR device. An operating condition of the exhaust gas source can include speed of a vehicle powered by the exhaust gas source, and/or mileage of a vehicle powered by the exhaust gas source, for example.

An increased reductant dosing rate relative to a baseline reductant dosing rate can be defined as a prescribed value (e.g., a 5 grams per second increase in reductant dosing rate) or as a multiplier (e.g., 1.5 times the baseline reductant dosing rate). For example only, a dosing adaptation comprising a 1.2 times increase in dosing rate can be considered a normal variation in dosing rate, whereas a dosing adaptation comprising a 1.5 times increase in dosing rate can be considered a threshold at which an active PF device and/or SCRF device regeneration is suitably initiated. In some embodiments, a dosing adaptation can comprise meeting or exceeding a threshold reductant dosing rate. For example, a threshold reductant dosing rate can be defined as a prescribed value (e.g., a 5 grams per second reductant dosing rate).

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for controlling an exhaust gas treatment system including an exhaust gas stream supplied by an exhaust gas source to a selective catalytic reduction (SCR) device and a particulate filter device, the method comprising:
    detecting a threshold level of reductant deposits proximate the SCR device, wherein the threshold level of reductant deposits is represented as a $NO_x$ conversion discrepancy, and is detected using a reductant deposit model comprising:
        determining an actual SCR $NO_x$ conversion using measured process variables including exhaust gas flow and system temperature values, and comparing the actual SCR $NO_x$ conversion to a calibrated $NO_x$ conversion value to determine a $NO_x$ conversion discrepancy; and
initiating a SCR device service in response thereto.

2. The method of claim 1, wherein the SCR device comprises a selective catalytic reduction filter device.

3. The method of claim 1, wherein the SCR device service comprises an active regeneration of the particulate filter device.

4. The method of claim 3, wherein active regeneration comprises increasing the exhaust gas temperature.

5. The method of claim 3, wherein active regeneration comprises one or more of utilizing an electrically heated catalyst and utilizing an oxidizing catalyst device.

6. The method of claim 1, wherein comparing the actual SCR $NO_x$ conversion to the calibrated $NO_x$ conversion value comprises comparing several corresponding actual SCR $NO_x$ conversion values and calibrated $NO_x$ conversion values over a period of time.

7. The method of claim 1, wherein the SCR device and a particulate filter device comprise a single selective catalytic reduction filter device.

8. The method of claim 1, wherein the particulate filter device is oriented upstream of the SCR device.

9. The method of claim 1, further comprising satisfying a secondary condition prior to initiating a SCR device service.

10. The method of claim 9, wherein the secondary condition comprises a reductant deposit threshold.

11. The method of claim 9, wherein the secondary condition comprises a mileage threshold for a vehicle powered by the exhaust gas source.

12. The method of claim 9, wherein the secondary condition comprises a sulfur storage threshold.

13. The method of claim 9, wherein the secondary condition comprises a SCR device age threshold.

14. The method of claim 9, wherein the secondary condition comprises an NH3 slip threshold.

15. The method of claim 9, wherein the secondary condition comprises a duration since the most recent SCR device service.

16. The method of claim 9, wherein the secondary condition comprises a reductant dosing adaptation.

17. The method of claim 1, wherein the exhaust gas stream comprises one or more NOx species.

18. A method for determining the presence of reductant deposits in a selective catalytic reduction (SCR) device, the method comprising:
determining an actual SCR $NO_x$ conversion using measured process variables including exhaust gas flow and system temperature values; and
comparing the actual SCR $NO_x$ conversion to a calibrated $NO_x$ conversion value to determine a $NO_x$ conversion discrepancy, wherein the NOx conversion discrepancy represents a threshold level of reductant deposits.

19. The method of claim 18, wherein comparing the actual SCR $NO_x$ conversion to the calibrated $NO_x$ conversion value comprises comparing several corresponding actual SCR $NO_x$ conversion values and calibrated $NO_x$ conversion values over a period of time.

* * * * *